H. C. WALLACE.
FERTILIZER DISTRIBUTING MECHANISM.
APPLICATION FILED NOV. 6, 1916.
1,275,332.
Patented Aug. 13, 1918.
2 SHEETS—SHEET 1.
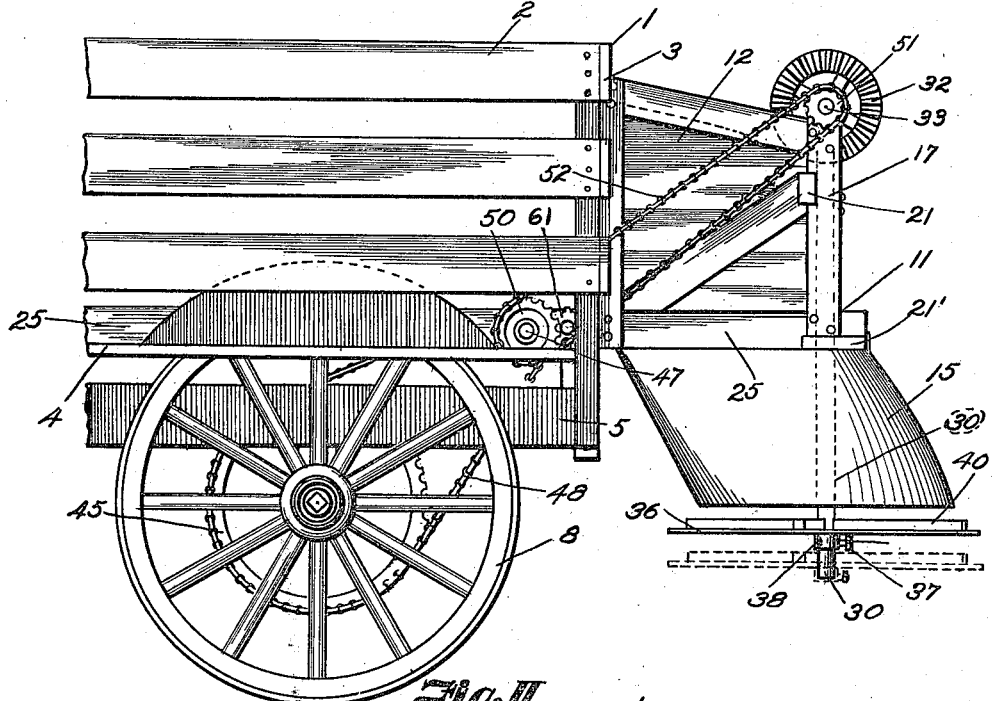
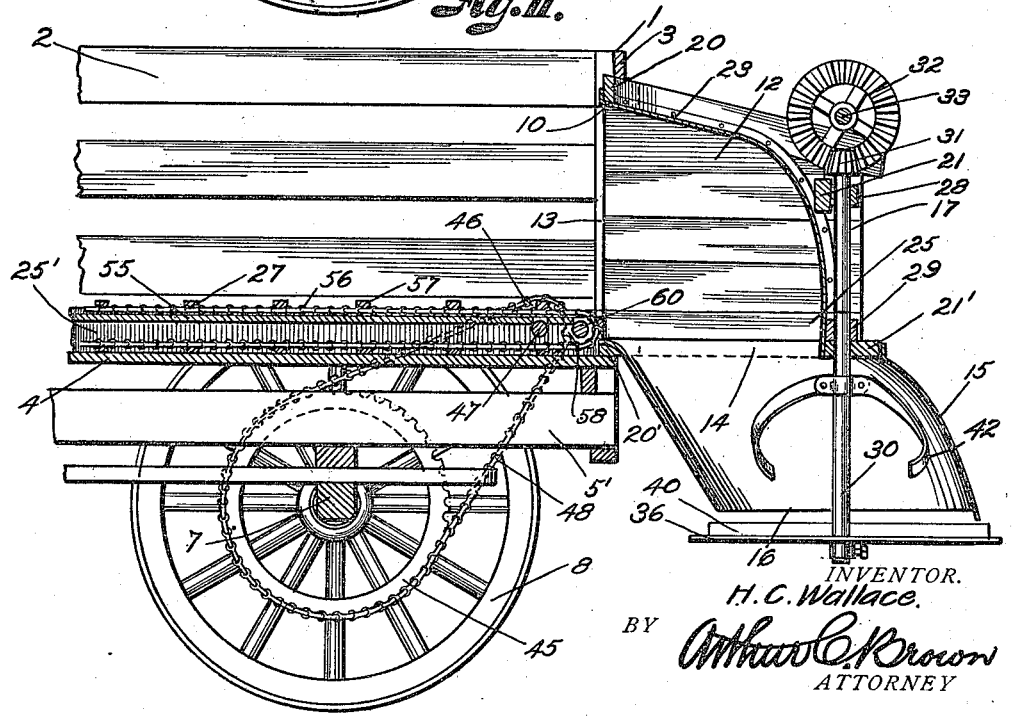
INVENTOR.
H. C. Wallace.
BY Arthur C. Brown
ATTORNEY

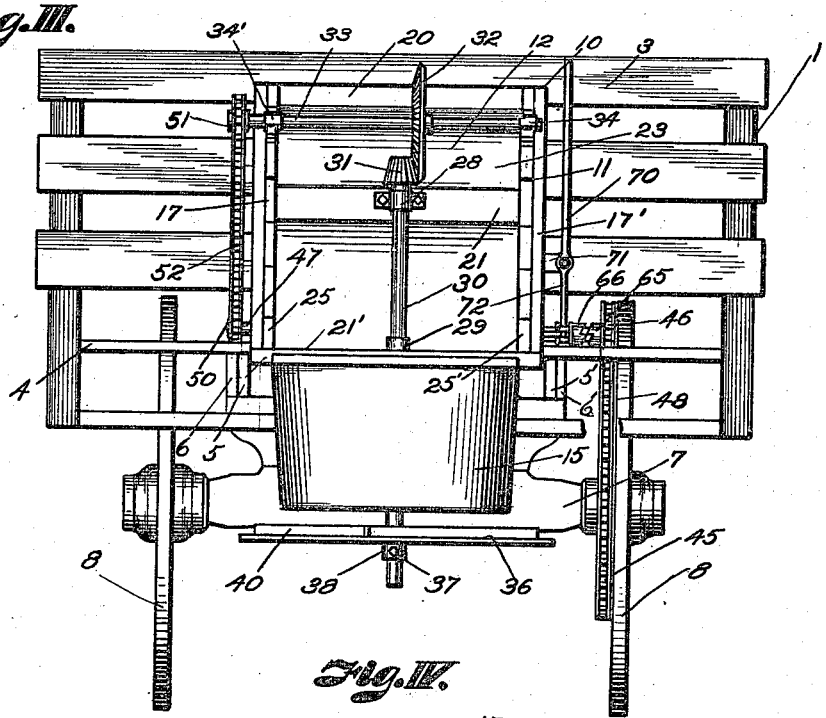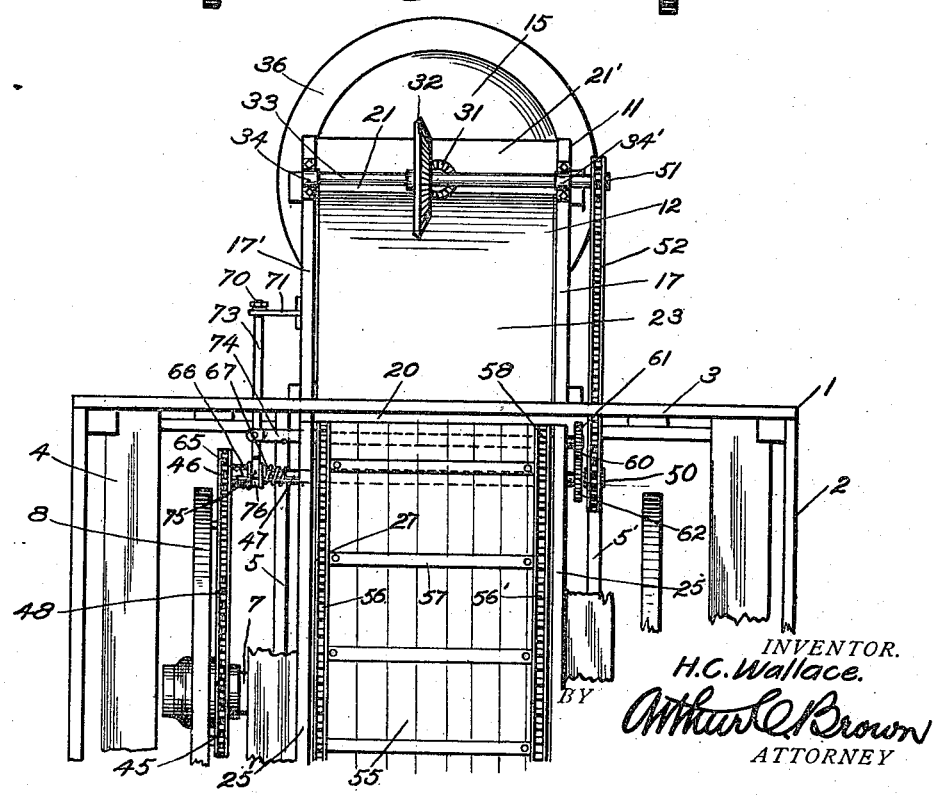

UNITED STATES PATENT OFFICE.

HALBERT C. WALLACE, OF KANSAS CITY, MISSOURI.

FERTILIZER-DISTRIBUTING MECHANISM.

1,275,332.  Specification of Letters Patent.  Patented Aug. 13, 1918.

Application filed November 6, 1916. Serial No. 129,705.

*To all whom it may concern:*

Be it known that I, HALBERT C. WALLACE, a citizen of the United States, residing at Kansas City, in the county of Jackson and State of Missouri, have invented certain new and useful Improvements in Fertilizer-Distributing Mechanism; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to fertilizer distributing mechanism, and particularly to a device for distributing or spreading manure, straw or the like, over a ground surface to fertilize the soil, conserve the moisture and prevent blowing of the soil; the principal object of the invention being to provide such a device which is complete in one structure and may be easily and quickly attached to or detached from an ordinary hay rack without impairing the usefulness of the rack for other purposes.

A further object of the invention is to provide mechanism whereby the area spread of the material as it is delivered therefrom may be regulated and to so place the driving gearing that it is eliminated from the spreader, so that it will not be clogged or otherwise hindered in its operation by the distributed material.

In accomplishing these objects I have provided improved details of structure, the preferred forms of which are illustrated in the accompanying drawings, wherein:

Figure I is a side view of a rack equipped with a spreading device constructed according to my invention.

Fig. II is a central longitudinal section of the same.

Fig. III is an end view of the rack and spreading mechanism.

Fig. IV is a plan view of the same, particularly illustrating the driving mechanism for operating the distributer and conveyer.

Referring more in detail to the drawings:

1 designates a rack of the ordinary type such as is used for carrying hay, or the like, comprising the side boards 2, end boards 3, floor 4 and bed sills 5—5', on which the rack frame is mounted, and which in turn seat on the bolsters and between the standards 6—6' of the wagon gears comprising the axles 7 carried by the ground wheels 8.

At the back end of the rack the boards 3 are cut away to form a central opening 10 through which the material carried in the rack for distribution may be fed into the distributing or spreading device 11.

The spreader 11 comprises a receiving hopper 12 of box-like construction, the forward end of which is provided with an opening 13 and is located within the opening 10 at the rear of the rack to receive the material therefrom. The hopper also has a bottom opening 14 through which the material after being delivered through the opening 13 is admitted into a delivery basket 15 that is attached to the hopper 12 beneath the opening 14, and has a circular base opening 16 through which the material is discharged to the soil.

The hopper 12 which first receives the material from the rack comprises opposite side frames 17—17' which are held in substantial vertical spaced relation by cross bars 20—20' at upper and lower edges of the opening 13 and by cross bars 21—21' at the rear of the hopper, also by a curved metallic plate 23 which forms the upper and back walls of the hopper and guides the material from the rack into the basket 15.

In order to support the spreading mechanism substantially adjacent the opening 10 and to provide perfect alinement at all times, I extend the base rails 25—25' of the opposite side frames 17—17' within the rack where they are supported on and removably attached by any suitable means to the floor 4 of the rack; the outer ends of the said rails forming a support for the distributing mechanism and the inner portions forming the side frames of a conveyer mechanism 27, whereby the material in the rack is carried to the distributer mechanism.

Suspended vertically within bearings 28—29 on the cross bars 21—21' and extending through the basket 15 and concentrically from the circular basket opening 16 is a shaft 30, and mounted on the upper end of said shaft is a bevel gear wheel 31 that meshes with a larger bevel gear wheel 32 mounted on a horizontal shaft 33 that is carried in bearings 34—34' oppositely placed on the side frames 17—17'.

Slidably mounted on the lower end of the shaft 30 beneath the basket opening 16 is a horizontally disposed disk 36, which is slightly greater in diameter and is adjustable along the shaft toward or away from the basket opening to determine the spread of the material delivered from the basket and may be locked at an adjusted position by means of a set screw 37 which threads through the supporting collar 38 on the disk and may be tightened against the shaft.

Mounted on the upper face of the disk 36 are radially extending flanges 40 by which the material delivered on the disk from the basket is thrown outwardly and scattered over the ground surface, it being apparent that the flanges give the material a wider range than would be possible if the disk were left smooth; the construction being such as is common in broad cast seeders, sand spreaders, etc.

Movably clamped on the vertical shaft 30 within the basket 15 are oppositely extending blades or agitator arms 42, which are carried forwardly and downwardly within the basket in auger fashion and are adapted to revolve with the shaft 30 to catch the material as it is delivered into the basket and to separate all clogged bunches and to throw the material downwardly against the delivery disk in a thoroughly comminuted condition.

Means for driving the conveyer and spreading mechanism comprises a gear ring 45, which is mounted concentrically on the inner face of one of the ground wheels 8, and running thereon and over a sprocket wheel 46 carried on a shaft 47 mounted transversely within the conveyer side rails 25—25' is a chain belt 48. Also mounted on the shaft 47, at the end opposite the sprocket wheel 46, is a sprocket wheel 50, and running thereon and over a sprocket wheel 51 on the horizontal shaft 33 is a chain belt 52. With this connection it will be seen that as the wagon advances the shafts 47 and 33 are revolved by the chains running over the gears carried thereby and through the gearing wheels 31—32, the vertical shaft 30 is revolved to actuate the spreading disk 36.

The conveyer mechanism comprises the spaced side rails 25—25' that support a floor 55 over which an endless chain rake operates toward the distributer to carry the material thereto; the said rake comprises spaced chains 56—56' provided at spaced intervals with cross slats 57, and run over sprocket wheels 58 mounted at opposite ends of the conveyer on the cross shafts 60.

To operate the conveyer rake I provide the rear shaft 60 at one end with a gear wheel 61 which meshes with a gear 62 on the shaft 47, so that as the shaft 47 is revolved by motion of the wagon the conveyer is likewise operated to feed the distributer.

I also provide a clutch mechanism, whereby the device may be thrown in or out of gear, consisting of a clutch collar 65 that is formed integrally with the gear 46 and revolves therewith on the shaft 47 and a coöperating collar 66 that is slidably keyed on the shaft 47 and is normally held in engagement with the collar 65 by means of a spring 67 which incloses the shaft and bears against the frame 25.

To actuate the clutch collar 65 I provide a lever 70 at the rear of the rack, which is pivotally mounted on a bearing 71 on the side frame 17 and has a downwardly extending arm 72 which pivotally connects at its lower end with a lever arm 73 mounted beneath the rack on a bracket 74 that is attached to the frame rails 25'; the said lever being provided with a yoke 75 which operates in a slot 76 in the collar 66 in such a manner that by actuating the lever 70 laterally the lever arm 73 is simultaneously rocked to move the collar 66 out of operative engagement with the clutch collar 65, but will be returned thereto by the spring 67 when the actuating lever 70 is released.

Assuming that the parts are so constructed and the device mounted on a rack as described, the fertilizing material is loaded into the rack and taken to a field for distribution.

When it is desired to start the mechanism the operator throws the parts in gear by releasing the lever 70 which allows the clutch collars to be engaged to operate the driving shaft 47, which through the meshing gears 61 and 62 revolves the conveyer rake about its carrying members and by means of the chain belt 52 and gearing wheels 31—32 the spreading disk is revolved.

Material delivered onto the conveyer is discharged into the hopper 12 and falls into the basket 15 where it is caught by the rapidly revolving arms 42, whereby it is torn apart and augered downwardly onto the delivery disk where it is caught by the radially placed vanes, and is thrown outwardly and scattered over the ground surface.

In order to get a thin or thick spread of the material the disk is adjusted toward or from the opening, it being apparent that the material in passing from the lower or delivery end of the basket has a tendency to expand and should the disk be close up to the opening the material is delivered near the center of the disk and the centrifugal force created by the revolving disk discharges the material over a larger area than when the disk is lowered, and the material delivered from the basket strikes the delivery disk near its outer edges.

It will be noted that in the present device the conveyer and distributer parts are all attached and form a one piece structure, which may be quickly attached to the ordinary farm hay rack and will not prevent the rack from being used for other purposes later when the spreading mechanism is removed.

It will be seen that by placing the driving gearing above the spreader mechanism and suspending the shaft and spreader from said gearing the latter may be placed close to the ground and still have a maximum of clearance underneath. This construction also keeps the gearing out of the dirt and provides for a very low spread which prevents side winds from affecting the even distribution of the material.

Having thus described my invention what I claim as new therein and desire to secure by Letters-Patent, is:—

1. In a distributing device of the character described, a hopper comprising front intake and bottom discharge openings, an open bottom basket adapted for receiving material thereinto at one side, a rotatable shaft suspended vertically from the hopper and extending through the basket, agitator arms fixed to the shaft within the basket and a delivery disk adjustable in the lower end of the shaft toward or from the basket opening, and means for rotating the shaft.

2. The combination with a vehicle body of a distributing device for receiving material from the vehicle, comprising a hopper having front intake and bottom discharge openings, an open bottom basket having communication at one side with the discharge opening of the hopper, a rotatable shaft suspended vertically at the back of the hopper and extending through the hopper and centrally through the bottom opening thereof, agitator arms fixed on the shaft within the basket, and a delivery disk adjustable on the end of the shaft toward or from the basket opening and means for rotating the said shaft to actuate the agitator arms and delivery disk.

3. The combination with a vehicle body having an end opening, of a distributing device comprising a hopper having front intake and bottom delivery openings, supporting rails fixed to the hopper and extending through said vehicle body opening to support the hopper to receive material therein from said vehicle, an open bottom basket fixed to the hopper and adapted to receive material therefrom, a rotatable shaft suspended vertically at the back of the hopper and extending through the hopper and centrally through the bottom opening thereof, agitator arms fixed on the shaft within the basket and a delivery disk adjustable on the end of the shaft toward or from the basket opening, and means for rotating the said shaft to actuate the agitator arms and delivery disk.

4. The combination with a vehicle comprising running gears and a body having a discharge opening in its end, of a distributing device comprising a hopper having front intake and bottom delivery openings, a frame for supporting said hopper extended into said vehicle body opening, conveyer mechanism mounted in said frame for delivering material from the vehicle body into said hopper, an open bottom basket having communication at the side with the delivery opening of the hopper, a shaft extended into said basket and concentrically through said opening, a spreading element on the shaft below the opening, an agitator fixed on the shaft within the basket to effect a downward movement of material therethrough, and means operable by movement of the vehicle running gears for operating the conveyer and spreading mechanism.

In testimony whereof I affix my signature.

HALBERT C. WALLACE.

Copies of this patent may be obtained for five cents each, by addressing the "Commissioner of Patents, Washington, D. C."